(12) United States Patent
Kirk et al.

(10) Patent No.: US 9,394,914 B2
(45) Date of Patent: Jul. 19, 2016

(54) CAGE POSITIONED TILTING PAD BEARING

(75) Inventors: R. Gordon Kirk, Blacksburg, VA (US); William Songer, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 282 days.

(21) Appl. No.: 14/342,066

(22) PCT Filed: Aug. 27, 2012

(86) PCT No.: PCT/US2012/052426
§ 371 (c)(1),
(2), (4) Date: Feb. 28, 2014

(87) PCT Pub. No.: WO2013/055454
PCT Pub. Date: Apr. 18, 2013

(65) Prior Publication Data
US 2014/0212283 A1    Jul. 31, 2014

Related U.S. Application Data

(60) Provisional application No. 61/546,193, filed on Oct. 12, 2011.

(51) Int. Cl.
*F01D 25/18*    (2006.01)
*F04D 29/056*    (2006.01)
*F04D 25/04*    (2006.01)
(Continued)

(52) U.S. Cl.
CPC .......... *F04D 29/0563* (2013.01); *F01D 25/166* (2013.01); *F02B 33/34* (2013.01); *F04D 25/04* (2013.01); *F04D 29/061* (2013.01); *F16C 17/03* (2013.01); *F16C 33/02* (2013.01);
(Continued)

(58) Field of Classification Search
CPC ... F04D 13/043; F04D 25/04; F04D 29/0563; F04D 29/061; F01D 25/166; F02B 37/00; F02B 39/00; F02B 33/34; F02C 6/12; F16C 17/02; F16C 17/03; F16C 33/02; F16C 33/06; F16C 33/1025; F16C 33/1065
See application file for complete search history.

(56) References Cited

U.S. PATENT DOCUMENTS 2,782,080 A * 2/1957 Norton ...................... F16C 9/00
384/578
3,708,216 A * 1/1973 Gerling ................... F16C 25/02
384/312

(Continued)

*Primary Examiner* — Ninh H Nguyen
(74) *Attorney, Agent, or Firm* — Whitham, Curtis & Cook, P.C.

(57) ABSTRACT

A tilting pad bearing for a high speed rotary machines, such as a turbocharger for an internal combustion engine, comprises a cage and a plurality of tilting pads. The cage is formed by two annular rings separated by spacers machined from a single billet of high-temperature metal. The bearing pads are inserted between the spacers of the cage. One or more O-rings retain the bearing pads within the cage during assembly of the bearing but are not required after installation of the bearing. When retained in the final assembly and installation of the bearing, the O-rings allow tilting movement of the pads within the cage. The outer surfaces of the spacers have a plurality of grooves, and outer surfaces of each of the pads have matching grooves. One of the grooves is an oil groove, wherein the oil groove of the spacers communicating with and oil inlet holes in the spacers. At least one of the other grooves receives an O-ring that hold the pads in place in the cage during installation. When two O-rings are used on either side of the oil groove in the final assembly, the O-rings serve to direct oil to the oil groove and prevent or reduce oil leakage.

20 Claims, 8 Drawing Sheets

(51) Int. Cl.
  *F04D 29/06* (2006.01)
  *F16C 33/02* (2006.01)
  *F16C 33/06* (2006.01)
  *F16C 33/10* (2006.01)
  *F01D 25/16* (2006.01)
  *F16C 17/03* (2006.01)
  *F02B 33/34* (2006.01)

(52) U.S. Cl.
  CPC ............ *F16C 33/06* (2013.01); *F16C 33/1025* (2013.01); *F16C 33/1065* (2013.01)

(56) References Cited

U.S. PATENT DOCUMENTS

| | | | | |
|---|---|---|---|---|
| 3,823,991 | A | * | 7/1974 | Lamperski .............. F16C 17/03 384/309 |
| 4,337,985 | A | * | 7/1982 | Gerling .................. F16C 33/74 384/132 |
| 4,969,805 | A | * | 11/1990 | Romeo .................. F01D 25/24 417/360 |

* cited by examiner

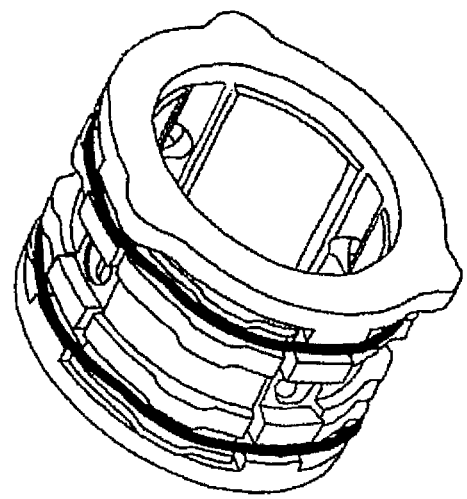
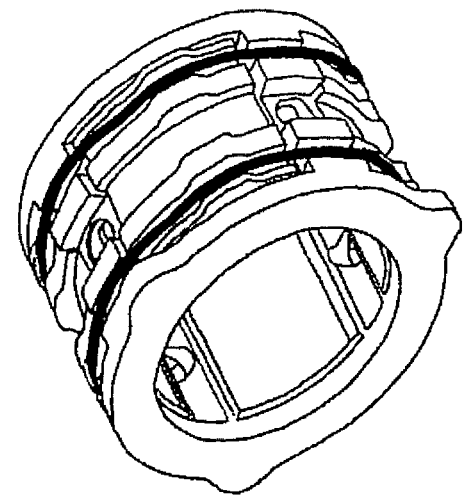
FIG. 8

CAGE POSITIONED TILTING PAD BEARING

BACKGROUND OF THE INVENTION

1. Field of the Invention

The present invention generally relates to bearings having limited radial space for the hydrodynamic bearing housing and, more particularly, to a novel cage positioned tilting pad bearing having particular application in turbochargers and other high rotary speed devices.

2. Background Description

High speed turbochargers are intended to increase the power of internal combustion engines. The first turbocharger was invented in the early twentieth century by the Swiss engineer Alfred Buchi who introduced a prototype to increase the power of a diesel engine. Turbocharging was not widely accepted at that time, but in the last few decades, turbocharging has become standard for most diesel engines and is used in many gasoline engines as well. Since the earliest turbocharger prototypes, researchers have attempted to improve turbocharger reliability and increase turbocharger life (Born, H. R., "Analytical and experimental investigation of the stability of the rotor-bearing system of new small turbocharger," in *Proceedings of the Gas Turbine Conference and Exhibition*, Anaheim, Calif., May 31-Jun. 4, 1987). Since vibration-induced stresses and bearing performance are major failure factors, rotordynamic analysis should have been an important part of the turbocharger design process. A thorough rotordynamic investigation was, however, very difficult and relatively few studies were published in the early years.

Advances in rotor dynamic analysis computer programs have now made the analysis of a turbocharger rotor-bearing system a reality (Gunter, E. J. and Chen, W. J., 2001, *DyRoBeS—Dynamics of Rotor Bearing Systems User's Manual*, RODYN Vibration Analysis, Inc., Charlottesville, Va.). Manufacturers have begun using these tools to better understand the dynamics of high speed turbochargers. Design improvements, however, cannot depend on computational analysis alone (Holmes, R., Brennan, M. J., and Gottrand, B., "Vibration of an automotive turbocharger—a case study," in *Proceedings of the 8th International Conference on Vibrations in Rotating Machinery*, Swansea, UK, Sep. 7-9, 2004, pp. 445-450) and on-engine test data are still required for these still very difficult analytical predictions.

A previous investigation used a commercial finite element analysis (FEA) computer program to model the dynamics of the turbocharger (Alsaeed, A. A., 2005, "Dynamic Stability Evaluation of an Automotive Turbocharger Rotor-Bearing System," M. S.

Thesis, Virginia Tech Libraries, Blacksburg, Va., and Kirk, R. G., Alsaeed, A. A. and Gunter, E. J., 2007, "Stability Analysis of a High-Speed Automotive Turbocharger," *Tribology Transactions*, 50(3), pp 427-434). That investigation demonstrated how linear analysis can be beneficial for understanding the basic experimental dynamic performance of the turbocharger rotor bearing system. This current experimental research extends previous experimental work with on-engine testing (Andres, L. and Kerth, J., "Thermal effects on the performance of floating ring bearings for turbochargers," *Proceedings of the Institute of Mechanical Engineers Journal of Engineering Tribology* 218(J), 2004, pp. 437-450, Kirk, R. G., Alsaeed, A., Liptrap, J., Lindsey, C., Sutherland, D., Dillon, B. et al., "Experimental test results for vibration of a high speed diesel engine turbocharger," *Tribology Transactions* 51(4), 2008, pp. 422-427., and Kirk, R. G., A. Kornhauser, J. Sterling, and A. Alsaeed, 2010, "Turbocharger On-Engine Experimental Vibration Testing," *ASME Journal of Vibration and Control*, 16(3): 343-355). The past testing of custom design fixed geometry design bearings, demonstrated the non-linear jump for no-load conditions at certain speeds (Kirk, R. Gordon, et al., "Influence of Turbocharger Bearing Design on Observed Linear and Nonlinear Vibration," ASME/STLE IJTC2010-41021, San Francisco, Oct. 17-20, 2010).

A turbocharger consists basically of a compressor and a turbine coupled on a common shaft. The turbocharger increases the power output of an engine by compressing excess air into the engine cylinder, which increases the amount of oxygen available for combustion. Since the output of reciprocating internal combustion engines is limited by the oxygen intake, this increases engine power (Ward, D. et al., U.S. Pat. No. 6,709,160). Since the turbine is driven using energy from the exhaust, turbocharging has little effect on engine efficiency. By contrast, a supercharger using power from the engine shaft to drive a compressor also increases power, but with an efficiency penalty.

An important factor in the design of an automotive turbocharger is the initial cost. The same power increase provided by the turbocharger can be provided by simply building a larger engine. Since engine weight is not a major part of overall weight for a diesel truck, the turbocharger is only competitive if it is less expensive than increasing engine size. For passenger cars the turbocharged diesel must compete with lighter and less expensive gasoline engines. To keep costs down while maintaining reliability, the designs of automotive turbochargers are usually as simple as possible.

Many automotive-size turbochargers incorporate floating bushing journal bearings. These bearings are designed for fully hydrodynamic lubrication at normal operating speeds. For low cost and simple maintenance, turbochargers use the engine oil system for lubrication instead of having a separate system.

The primary consideration in the rotordynamic design of high-speed machinery is to control and minimize vibration. Large-amplitude vibration is undesirable in that it generates noise and can have large amplitudes that cause rotor-stator rub. In most rotating machinery, the dominant vibration is a forced response to rotor imbalance. There exists, however, another class of vibration termed rotordynamic instability or self-excited vibration. Vibration of this type requires a different design approach. Almost all rotors of automotive turbochargers exhibit both forced vibrations and self-excited vibrations (Choudhury, Pranabesh De, "Rotodynamic stability case studies", *International Journal of Rotating Machinery*, 2004, pp. 203-211).

Forced vibrations from imbalance are harmonic and occur at the turbo shaft speed. They are generally driven by either mass eccentricity in the rotor or shaft bow. Mass eccentricity is a result of manufacturing tolerances, while shaft bow can be due to manufacturing tolerances or thermal effects. Unbalance vibrations can usually be minimized by designing the rotating element so that no natural frequencies are close to the desired operating speed range. Thermal bowing is the only exception to this previous statement.

Self-excited vibrations usually occur at frequencies that are a fraction, rather than a multiple, of shaft speed. The sub-synchronous vibrations do not require a driving imbalance in the rotating element, but are due to the interaction between the inertia and elasticity of the rotating elements, the aerodynamic forces on the rotor and the hydrodynamic forces in the bearings.

Rotordynamic design of turbochargers has been based on both linear and nonlinear vibration analysis (Holmes, R., Brennan, M. J., and Gottrand, B., "Vibration of an Automotive Turbocharger A Case Study", *Proc. 8th International Conference on Vibrations in Rotating Machinery*, Swansea, UK, 2004 pp. 445-450, Li, C. H. And Rohde, S. M., "On the Steady State and Dynamic Performance Characteristics of Floating Ring Bearings", *Trans. ASME Journal of Lubrication Technology*, 103, 1981, pp. 389-397, and Shaw, M. C., and Nussdorfer, T. J., "An Analysis of the Full-floating Journal Bearing", Report No. 866, National Advisory Committee for Aeronautics (NACA)). It was found that floating bushing bearings were more resistant to self-excited vibration than plain journal bearings, and these became widely used. However, with floating bushing bearings many turbochargers show high levels of sub-synchronous vibration (Gunter, E. J., and Chen, W. J., "Dynamic Analysis of a Turbocharger in Floating Bushing Bearings", *Proc. 3rd International Symposium on Stability Control of Rotating Machinery*, Cleveland, Ohio, 2005, and Tanaka, M., Hatakenaka, K. And Suzuki, K., "A theoretical Analysis of Floating Bush Journal Bearing with Axial Oil Film Rupture Being Considered", *Trans. ASME Journal of Tribology*, 124, 2002, pp. 494-505).

The desire would be to have a small synchronous vibration that would allow the bearing to have less dynamic loading and better performance. It is also desirable to provide a turbocharger capable of higher top speeds with less oil leakage and hence lower emissions.

SUMMARY OF THE INVENTION

It is therefore an object of the present invention to improve bearings having limited radial space for the hydrodynamic bearing housing.

It is another more specific object of the invention to improve turbocharger performance through a new and innovative design feature in the bearing.

According to the invention, a tilting pad bearing for a high speed rotary machines comprises a cage and a plurality tilting pads, typically four in number. The cage is formed by two annular rings separated by spacers machined from a single billet of metal. The bearing pads are inserted between the spacers of the cage. One or more O-rings retain the bearing pads within the cage. The O-rings allow tilting movement of the pads within the cage. The outer surfaces of the spacers have grooves, and outer surfaces of each of the pads have matching grooves. One of the grooves is an oil groove. The oil groove of the spacers communicates with oil inlet holes in the spacers. The other groove or grooves receive O-rings that hold the pads in place in the cage during assembly of the bearing. When two O-rings are used on either side of the oil groove in the final assembly, the O-rings serve to direct oil to the oil groove and prevent or reduce oil leakage.

The new bearing design can be used in turbochargers that have the existing standard floating bearing design of the turbocharger industry. The size of the bearing would be determined by the current bearing housing inside diameter in addition to the shaft diameter. The design can also be utilized on new turbochargers with essentially no modification to the basic bearing housing design. The novel bearing design consists of a positioning cage that isolates each pad one from the other, and allows each paid to load itself owing to the offset and preloaded pad design. The cage-and-pad assembly is further held by small diameter O-rings that prevents the pads from coming out of the cage during assembly. In addition, the small preload O-ring assists in directing the majority of the oil flow around the bearing assembly and into the oil inlet holes of the cage.

The new bearing according to the present invention has the potential to eliminate the nonlinear jump behavior as well as the large amplitude sub-synchronous instability frequencies.

BRIEF DESCRIPTION OF THE DRAWINGS

The foregoing and other objects, aspects and advantages will be better understood from the following detailed description of a preferred embodiment of the invention with reference to the drawings, in which:

FIG. 8 is a perspective view of the second embodiment of the invention assembled with the spin-restrained cage of FIG. 3 and with O-rings in place;

DETAILED DESCRIPTION THE INVENTION

The design of rotating machinery is concerned with the placement of the critical speeds, the response sensitivity to imbalance and the predicted stability of the rotor bearing system. The program DyRoBeS© (Gunter and Chen, 2001, ibid., and Chen, Wen J., and Edgar J. Gunter, *Introduction to Dynamics of Rotor-Bearing Systems*, Victoria: Trafford, 2007) has been used to compute the analysis results in the following discussion. The most basic analysis is the undamped critical speed analysis that concerns only the rotor shaft and a range of possible stiffness values for the bearings. To make that analysis meaningful, it is necessary to have a range of expected stiffness for the bearings. The first two modes are nearly rigid body modes while the third mode is a bending mode and operation should be below this critical speed. The turbocharger that is used on the available diesel engine has been designed to operate below this bending mode. The re-excitation of the first mode has been in the range from 10,000 to 20,000 cpm, the second mode was has been from 26,000 to 35,000 cpm (Kirk, R. Gordon., et al., 2010, ibid.).

Figure 1:
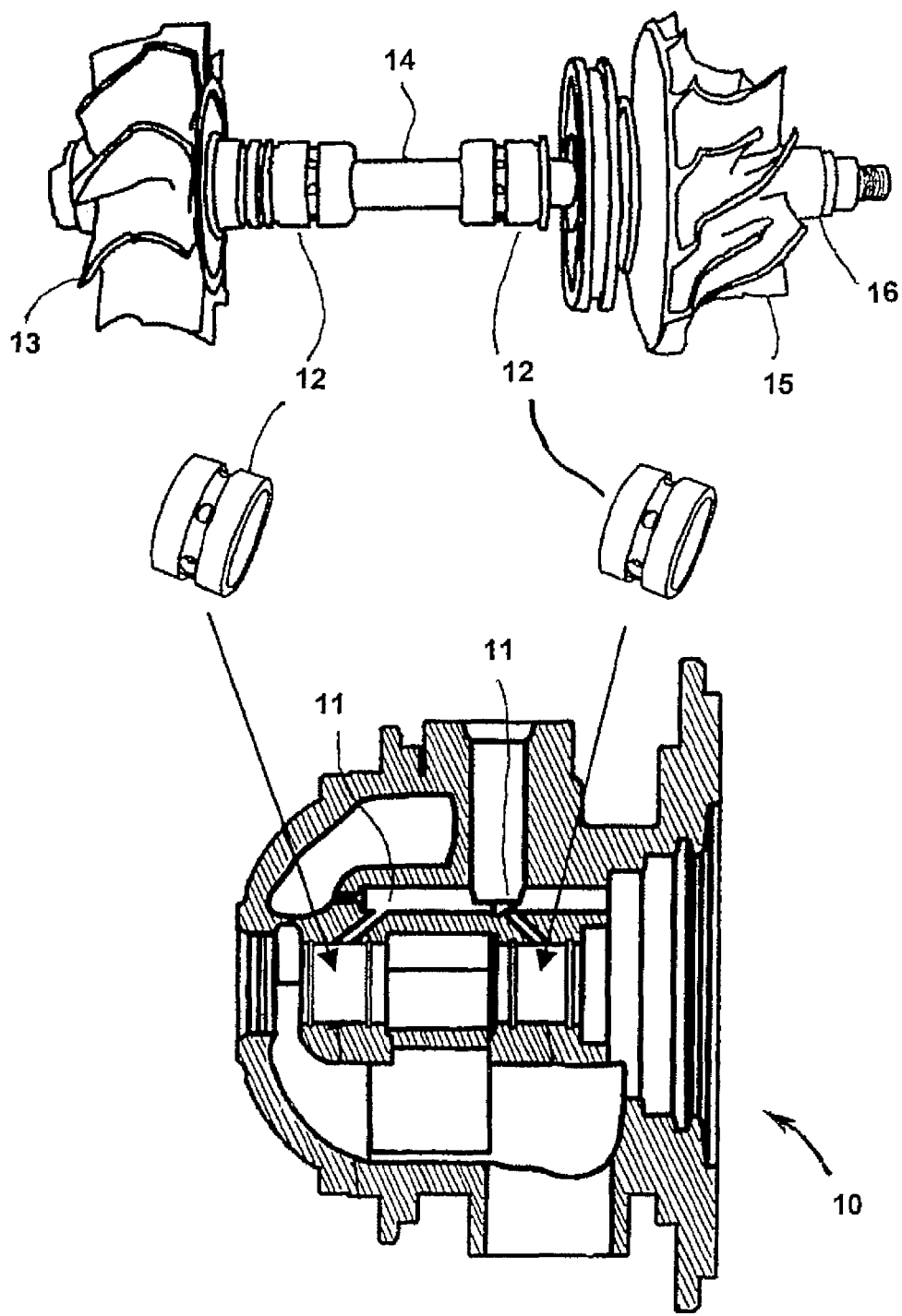
FIG. 1 is a partially cross-sectional and exploded view of a turbocharger housing and assembled turbocharger shaft with stock bearings shown above the housing.

A common design assembly for a turbocharger consists of a radial outflow compressor and a radial inflow turbine on a single shaft. Bearings are mounted inboard, with the compressor and turbine overhung. FIG. 1 is a partially cut-away and exploded view of a conventional turbocharger. As shown in FIG. 1, the housing 10 is cut away to show the locations of oil feed paths 11 to the bearings 12. The turbine rotor 13 in most common automotive turbochargers is connected to its shaft 14 by a friction or electron beam welding method. The compressor wheel 15, or impeller, is usually a clearance or very light interference fit on the other end of the shaft 14. A locknut 16 is used to hold the impeller against a shoulder on the shaft. Friction from the interference fit and/or nut clamping pressure is generally sufficient to transmit the torque, therefore splines or keys are not required. The bearings 12 have a single groove about their circumferences with oil passage holes to provide lubrication to the shaft 14.

Figure 2:
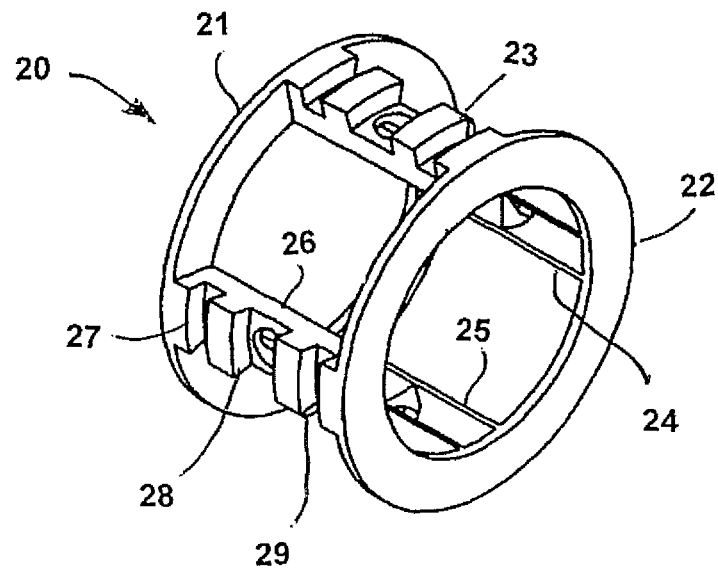
FIG. 2 is a perspective view of the basic cage for the tilting pad bearing according to the invention.

The new bearing is a multi-pad tilting design. As shown in FIG. 2, an embodiment of the new bearing consists of a positioning cage 20 composed of two annular rings 21 and 22 separated by four spacers 23, 24, 25, and 26. Each of the spacers is machined with three grooves 27, 28 and 29 in their outer surfaces. The innermost groove 28 is an oil groove which communicates with an oil hole or passage in the spacer. The two outermost grooves receive O-rings. The O-rings may be replaced with metallic split ring seals for very high temperature applications. The cage 20 is preferably machined from a single billet of high temperature resistant steel, such as stainless steel. Other methods of producing the cage are possible, such as casting with small finish machining if required. The pads may be made of a special bearing bronze, but could be made from other bearing materials.

Figure 3:
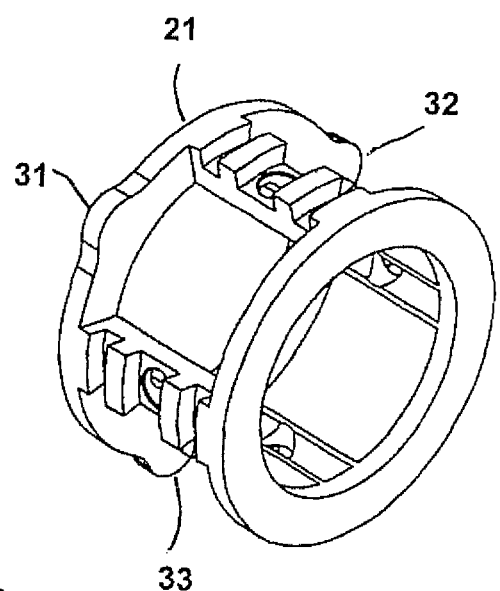
FIG. 3 is a perspective view of the basic cage shown in FIG. 2 with the addition of projections to restrain the cage from spinning the in the bearing journal.

In the embodiment shown in FIG. 2, the "pinch" of the O-rings is relied on to prevent unwanted spinning of the cage within the bearing journal. The depth of the O-ring grooves can be different (smaller) for the cage so as to cause pinch of the O-rings to prevent spin. A modification of the basic cage design of FIG. 2 is shown in FIG. 3. In this modification, one of the annular rings 21 is provided with projections or "ears" 31, 32 and 33. These projections are designed to mate with corresponding indents or reliefs in the bearing journal to resist spinning of the bearing in the bearing journal. In both of the embodiments of FIGS. 2 and 3, four tilting pads are used, but three pads or five pads could be used depending on the shaft journal diameter and also the magnitude of the loading and available axial space for the bearing.

Figure 4:
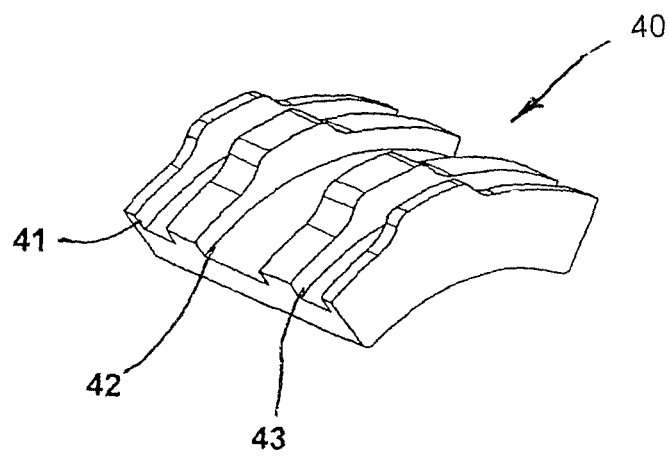
FIG. 4 is a perspective view of one of the pads for the tilting pad bearing according to the invention.
Figure 5:
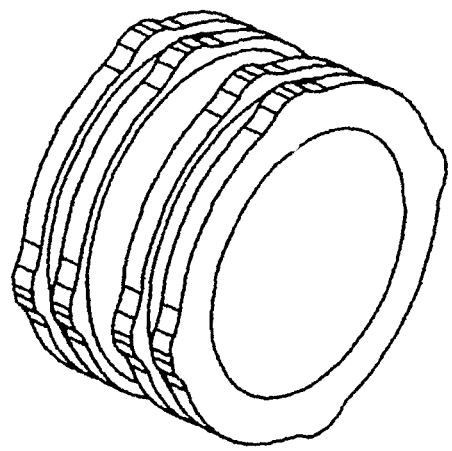
FIG. 5 is a perspective view of a pad ring from which four pads can be made.

FIG. 4 illustrates one of the pads 40 that is placed between adjacent spacers of the cage. As shown in FIG. 4, the outer surface is machined with corresponding grooves 41, 42 and 43 that align with the grooves in the outer surfaces of the spacers. In the embodiment shown, four pads are required, one for each of the four spaces between the spacers in the cage. FIG. 5 shows a pad ring from which the four pads can be made. The pad ring may be, for example, cast bearing bronze. The four pads are cut from this pad ring.

Figure 6:
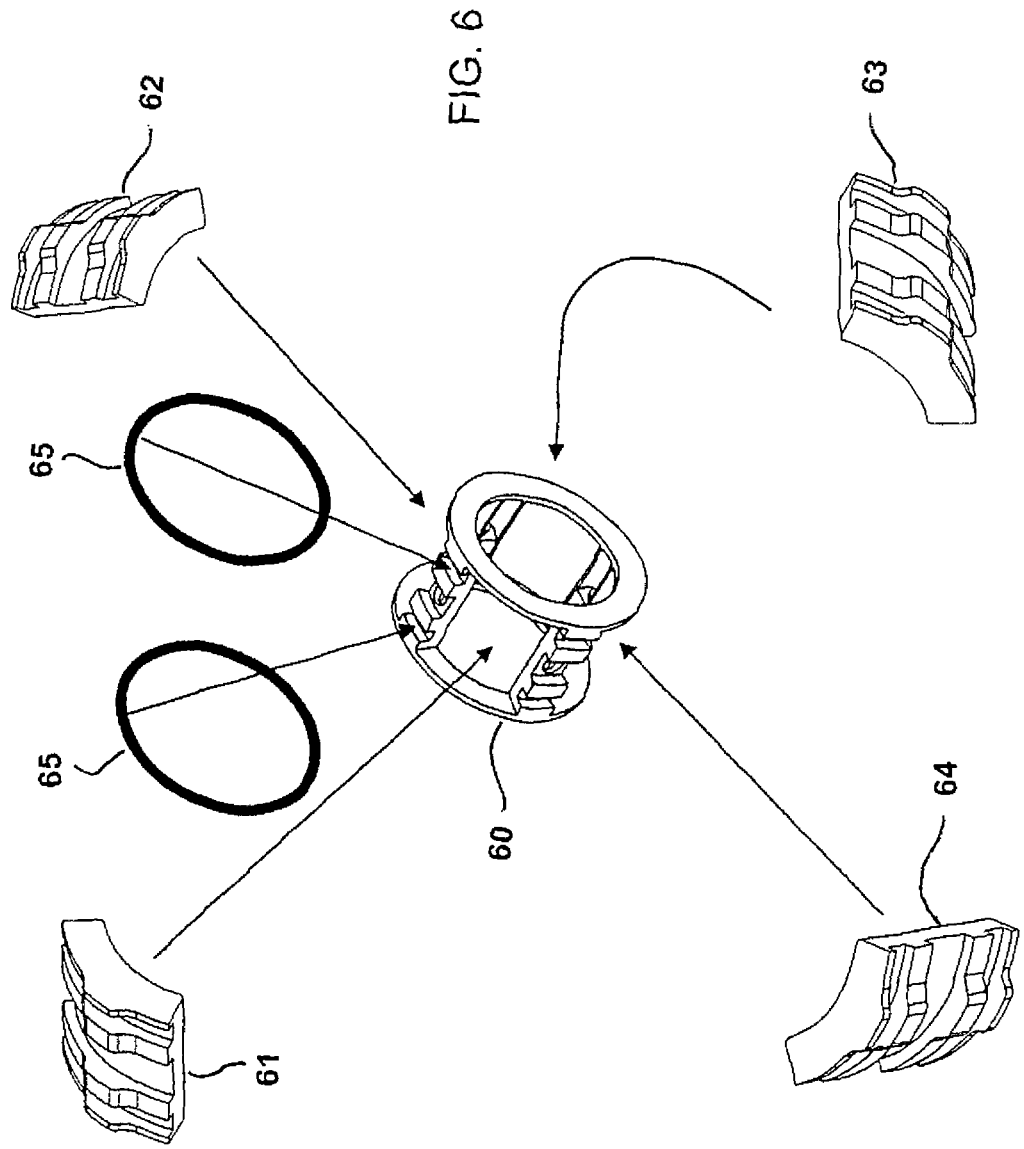
FIG. 6 is a perspective view of the basic cage of FIG. 2 and pads for the four tilting pad bearing according to one embodiment of the invention.

FIG. 6 shows a cage 60 of the type shown in FIG. 2 and four pads 61, 62, 63, and 64 of the type shown in FIG. 4 prior to bearing assembly. The cage 60 isolates each pad 61, 62, 63, and 64 from one another and allows each pad to load itself owing to the offset and preloaded pad design. The cage and pad assembly is further held by one or more small diameter O-rings 65 and 66 that prevent the pads from coming out of the cage during assembly. In the final assembly, the O-rings are optional and can be removed as the bearing assembly is inserted into the bearing journal. If used only for pre-assembly retention of the pads, a single O-ring would suffice with a single O-ring groove in the outer surfaces of the pads and spacers of the cage. The use of two O-rings in the final assembly, however, has the additional advantage of assisting in directing the majority of the oil flow around the bearing assembly and into the oil groove and the oil inlet holes of the cage. The O-rings do not resist the tilting action of each pad. As shown in FIG. 6, outer surfaces of the spacers and the outer surfaces of each of the pads 61-64 have matching grooves.

Figure 7:
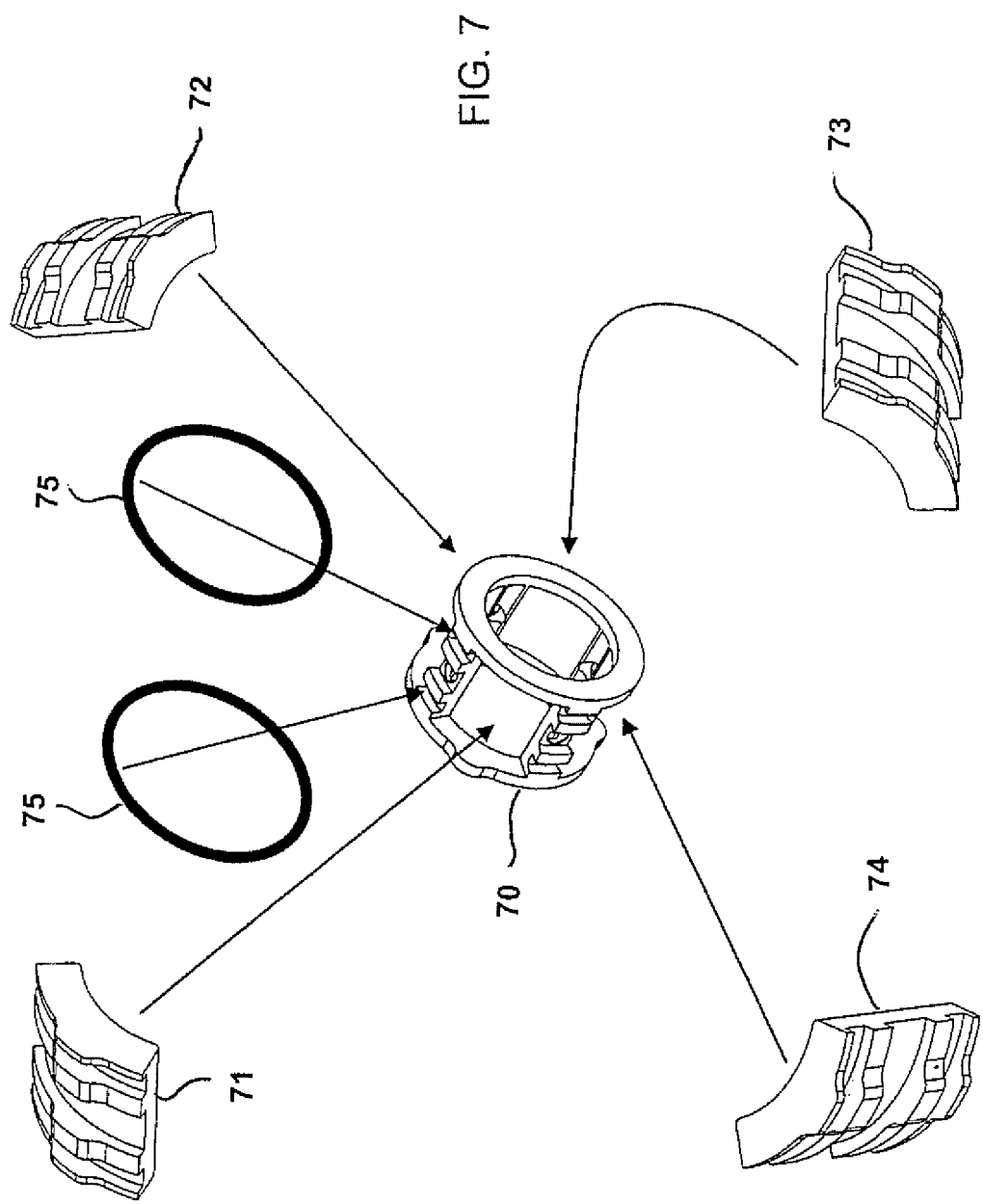
FIG. 7 is a perspective view of the cage of FIG. 3 and pads for the four tilting pad bearing according to a second embodiment of the invention.

FIG. 7 shows a cage 70 of the type shown in FIG. 3, four pads 71, 72, 73, and 74 of the type shown in FIG. 4 prior to bearing assembly and O-rings 75 and 76. FIG. 8 shows a pair of assembled tilt pad bearings using the cage shown in FIG. 3.

The novel concept in the design is the positioning of the pads by the cage to keep the pads independent and prevent the pads from dropping out when the bearing assembly is removed from the housing.

Figure 9:
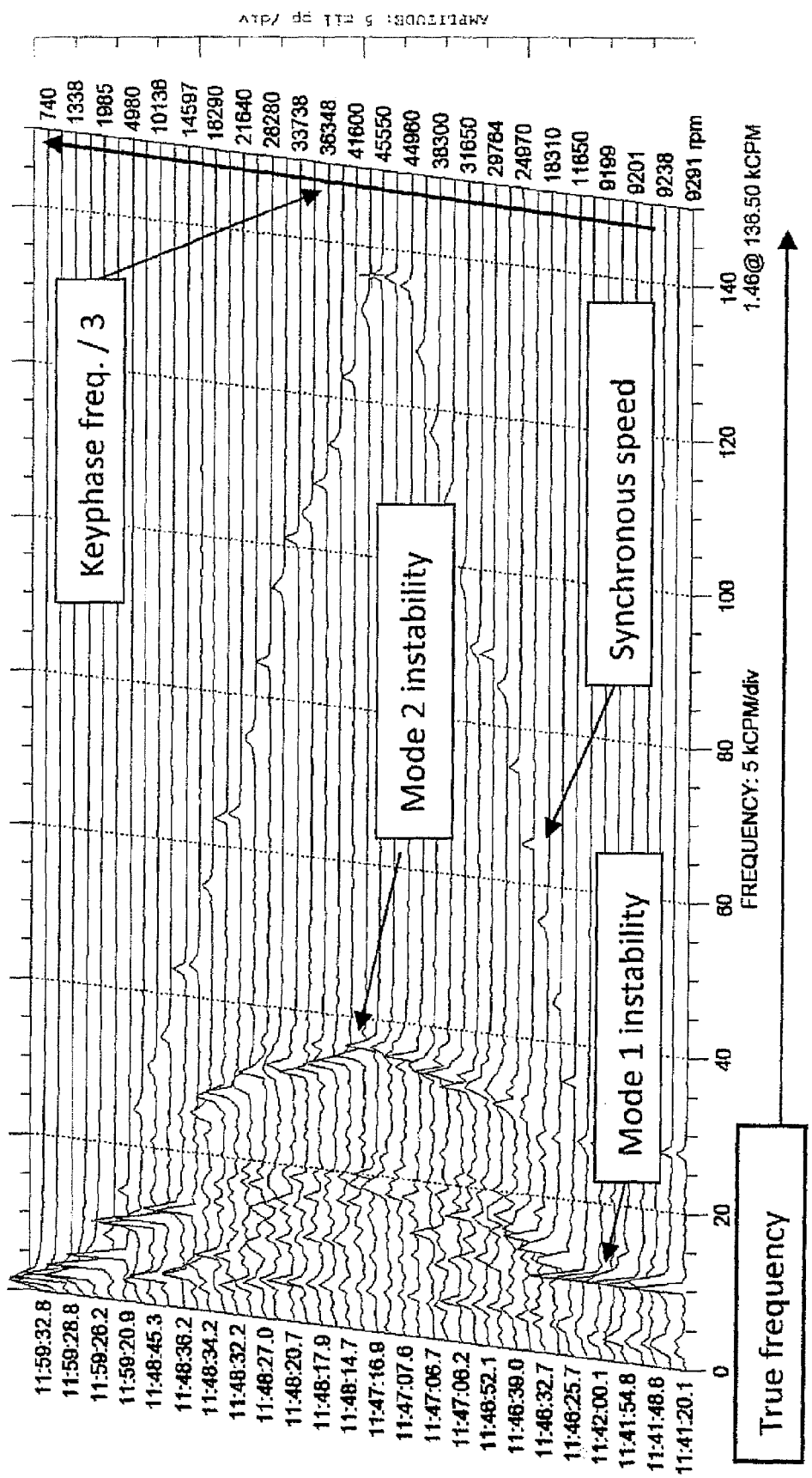
FIG. 9 is a graph showing typical spectrum content on stock bearing where the turbocharger is shown to be unstable in the first mode and second mode with a frequency in 12-20 kcpm frequency range.

The typical spectrum content of the stock bearings shown in FIG. 1 is shown in FIG. 9 where the turbocharger is shown to be unstable in the first and second modes with a frequency in the 12-20 kcpm frequency range, even at the engine idle speed. The second mode instability comes in at a shaft speed near 80 krpm in the 35-38 kcpm frequency range. This is typical of all stock bearings in this turbocharger (Kirk, R. Gordon., et al., 2010, ibid.), with past grooved design bearings producing lower frequencies with larger amplitudes. The engine was at design load for this result.

Figure 10:
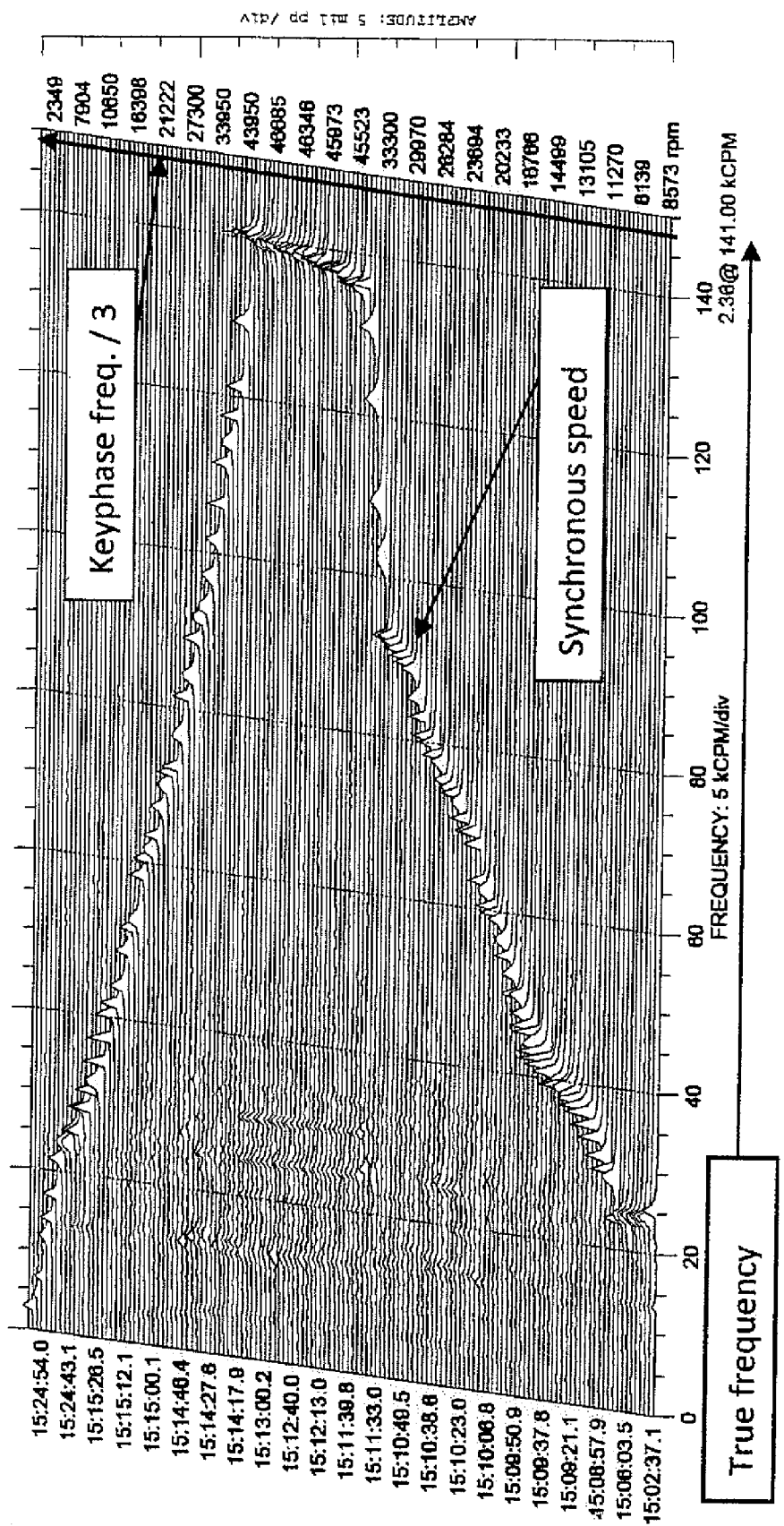
FIG. 10 is a graph showing spectrum content of the new cage design according to the invention.

The new tilting pad bearing design according to the invention eliminates the instabilities exhibited with the stock bearings. FIG. 10 shows the spectrum content of the tilting pad bearings according to the present invention used in the same turbocharger. As shown in FIG. 10, first and second mode instabilities are eliminated. The new design provides totally synchronous frequency content without the instabilities evident in the stock bearings.

While the invention has been described in terms of a single preferred embodiment, those skilled in the art will recognize that the invention can be practiced with modification within the spirit and scope of the appended claims.

What is claimed is as follows:

1. A tilting pad bearing for a high speed rotary machines comprising:
   a cage formed by two annular rings separated by a plurality of spacers as an integral metal structure; and
   a plurality of bearing pads of bearing metal inserted between the spacers of the cage,
   wherein outer surfaces of the spacers have a plurality of grooves, and outer surfaces of each of the bearing pads have matching grooves, a first one of the grooves is an oil groove the oil groove of the spacers communicating with oil inlet holes in the spacers.

2. The tilting pad bearing of claim 1, herein the two annular rings separated by spacers of the cage are machined from a single billet of metal.

3. The tilting pad bearing of claim 1, further comprising one or more O-rings retaining the bearing pads in the cage during assembly.

4. The tilting pad bearing of claim 3 wherein the O-rings are included in final assembly of the bearing, the O-rings allowing tilting movement of the pads within the cage.

5. The tilting pad bearing of claim 4, wherein at least a second one of the grooves receives an O-ring that hold the pads in place in the cage.

6. The tilting pad bearing of claim 1, wherein the cage is formed of four spacers separating the two annular rings and four bearing pads are inserted between the spacers of the cage.

7. The tilting pad bearing of claim 6, wherein three grooves are machined into the outer surfaces of the spacers and pads, the innermost groove being an oil groove and the two outermost grooves receiving O-rings.

8. The tilting pad bearing of claim 7, wherein the two outermost grooves are relatively shallow so as to pinch the O-rings within a bearing journal to resist spinning of the bearing within the bearing journal.

9. The tilting pad bearing of claim 6, wherein at least one of the annular rings is provided with at least one projection to restrain spinning of the cage within a bearing journal.

10. The tilting pad bearing of claim 1, further comprising one or more split ring metallic seals retaining the bearing pads in the cage.

11. The tilting pad bearing of claim 1, wherein the bearing is designed to be used on a shaft of a turbocharger.

12. A turbocharger for use with an internal combustion engine, comprising:
   a housing;
   a turbine rotor and an impeller mounted on a common shaft within the housing; and
   bearings supporting the common shaft adjacent each of the turbine rotor and the impeller within bearing journals in the housing, each of the bearings comprising:
   a cage formed by two annular rings separated by spacers machined from a single billet of metal; and
   a plurality of bearing pads inserted between the spacers of the cage,
   wherein outer surfaces of the spacers have a plurality of grooves, and outer surfaces of each of the bearing pads have matching grooves, a first one of the grooves is an oil groove, the oil groove of the spacers communicating with oil inlet holes in the spacers.

13. The turbocharger of claim 12, further comprising one or more O-rings retaining the bearing pads in the cage during assembly of the bearings in the turbocharger housing.

14. The turbocharger of claim 13, wherein the O-rings are included in final assembly of the bearing in the turbocharger housing, the O-rings allowing tilting movement of the pads within the cage.

15. The turbocharger of claim 14, wherein at least a second one of the grooves receives an O-ring that hold the pads in place in the cage.

16. The turbocharger of claim 12, wherein the cage is formed of four spacers separating the two annular rings and four bearing pads are inserted between the spacers of the cage.

17. The turbocharger of claim 16, wherein three grooves are machined into the outer surfaces of the spacers and pads of each of the bearings, the innermost groove being an oil groove and the two outermost grooves receiving O-rings.

18. The turbocharger of claim 17, wherein the two outermost grooves are relatively shallow so as to pinch the O-rings within a bearing journal to resist spinning of the bearing within the bearing journal.

19. The turbocharger of claim 16, wherein at least one of the annular rings of the cage of each bearing is provided with at least one projection to restrain spinning of the cage within a bearing journal.

20. A tilting pad bearing for high speed rotary machines comprising:
   a cage formed by two annular rings separated by a plurality of spacers as an integral metal structure, the two annular rings and spacers of the cage being machined from a single billet of metal; and
   a plurality of bearing pads of bearing metal inserted between the spacers of the cage and isolated from one another by the cage, the plurality of bearing pads being cut from a common pad ring,
   wherein outer surfaces of the spacers have a plurality of grooves, and outer surfaces of each of the bearing pads have matching grooves, a first one of the grooves is an oil groove, the oil groove of the spacers communicating with oil inlet holes in the spacers.

\* \* \* \* \*